United States Patent
Bertheas

[15] 3,639,695
[45] Feb. 1, 1972

[54] SYSTEMS FOR PROCESSING FREQUENCY MODULATED SIGNALS

[72] Inventor: Jean Bertheas, Paris, France
[73] Assignee: Thomson-CSF
[22] Filed: Feb. 4, 1969
[21] Appl. No.: 796,503

[30] Foreign Application Priority Data

Feb. 5, 1968  France.....................................138699

[52] U.S. Cl..................179/15.55 R, 343/17.2 PC, 235/181
[51] Int. Cl. ........................................................H04b 1/66
[58] Field of Search .....179/15.55, 15 AV, 15 AP, 15.55 TC, 179/15.55 R; 343/17.2 PC, 5; 328/58; 235/181

[56] References Cited

UNITED STATES PATENTS

| | | | |
|---|---|---|---|
| 2,958,039 | 10/1960 | Anderson | 235/181 |
| 3,046,545 | 7/1962 | Westerfield | 343/5 |
| 3,167,738 | 1/1965 | Westerfield | 235/181 |
| 3,292,175 | 12/1966 | Brandon | 343/17.2 PC |
| 3,261,969 | 7/1966 | Routh | 343/17.2 PC |

Primary Examiner—Kathleen H. Claffy
Assistant Examiner—Jon Bradford Leaheey
Attorney—Cushman, Darby & Cushman

[57] ABSTRACT

The invention relates to devices for either compressing or extending the duration of frequency modulated pulses. The signal-processing system of the invention comprises a converting device for modifying the duration of a signal without affecting its waveform and another transmission device having dispersive characteristics for further modifying the duration of the envelope of said signal. Since the above-mentioned converting device is capable of supplying more than one signal for each processed pulse, gating means are coupled to the converting means for gating out unwanted signals.

15 Claims, 6 Drawing Figures

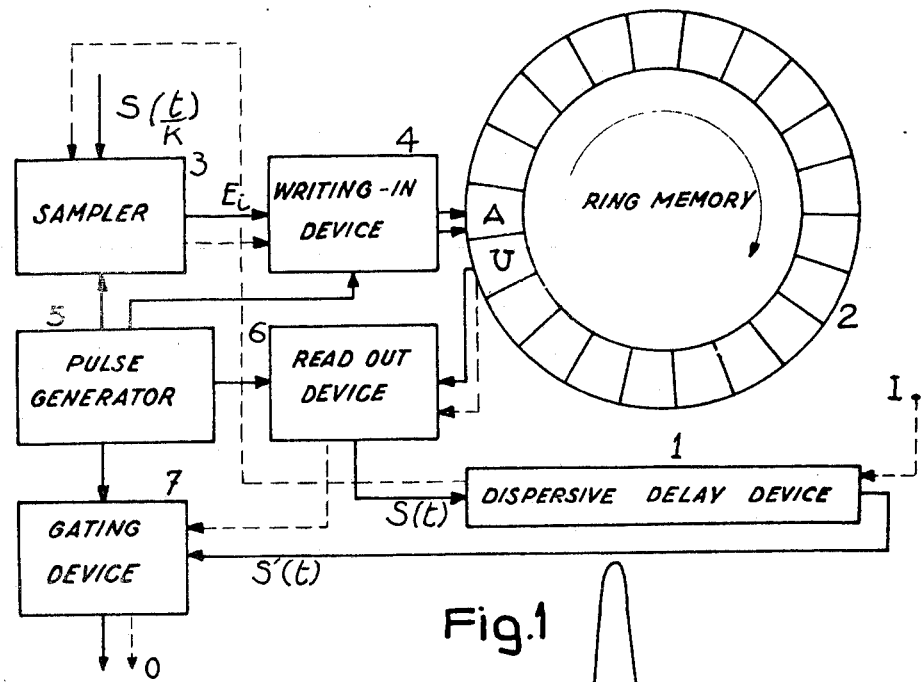
Fig.1
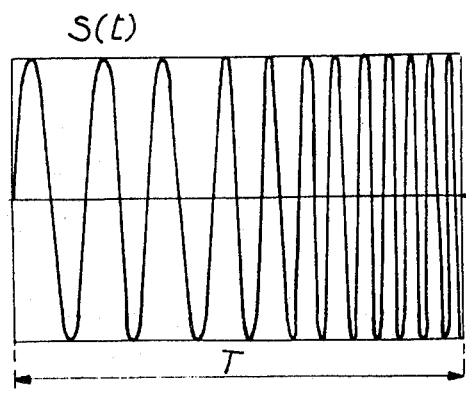
Fig.2
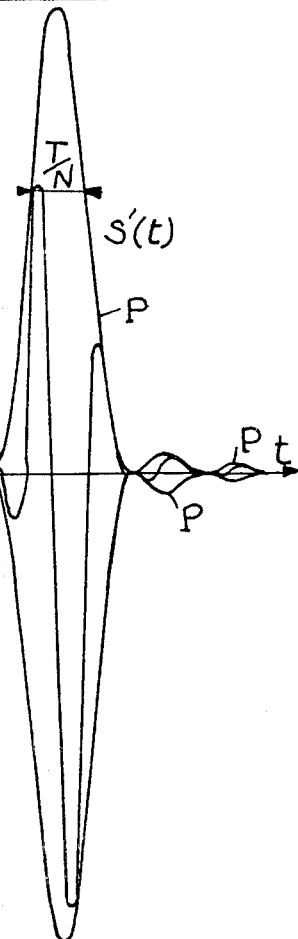

SYSTEMS FOR PROCESSING FREQUENCY MODULATED SIGNALS

The present invention relates to systems which, by an analogue process, carry out matched filtering of frequency modulated signals.

This technique, known as "pulse compression," makes it possible to create long range radar or sonar systems which have good resolving power at long range.

It is known to employ for the processing of frequency modulated electrical signals, dispersive systems such as electrical networks, dispersive acoustic lines and optical diffraction devices; these means are unmatched when the pulses to be compressed have a duration in the order of 1 second and a frequency modulation sweep of some tens of cycles per second. This situation arises in particular in submarine acoustics, where it is being attempted to design a high-performance sonar equipment or echo-sounder; the solution employed is to subject the signals to a prior processing which does not change their form but considerably reduces their duration.

In order to match the characteristics of the pulses received by a sonar equipment, to the characteristics of a dispersive system, it is known to employ a magnetic substrate memory, having two different scan speeds; these speeds are used alternately to record and reproduce the signals. The use of a recording and reproducing system for the preliminary processing of signals which are to be compressed, is not without its drawbacks; on the one hand, this technique can only be applied if the ratio of the speeds of scan of the data carrier, is moderate; on the other hand, the recording and reproducing mechanism is expensive, delicate and bulky.

According to the invention there is provided a signal processing system for modifying in two successive steps the duration of frequency modulated pulses delivered by a signal source, said system comprising: means having an input and an output channel for converting a signal corresponding to each of said pulses into at least one modified duration signal having the same waveform and a duration modified in the ratio K, gating means having a signal input coupled to said output channel and a control input; control means coupled to said converting means and to said control input for selecting one of said modified duration signals for each pulse to be processed and dispersive delaying means inserted within one of said channels for impressing another duration modification on each said pulses.

For a better understanding of the invention and to show how the same may be carried into effect reference will be made to the drawing accompanying the ensuing description and in which:

FIG. 1 is a simplified diagram of the system in accordance with the invention;

FIG. 2 is an explanatory diagram;

Figure 3:
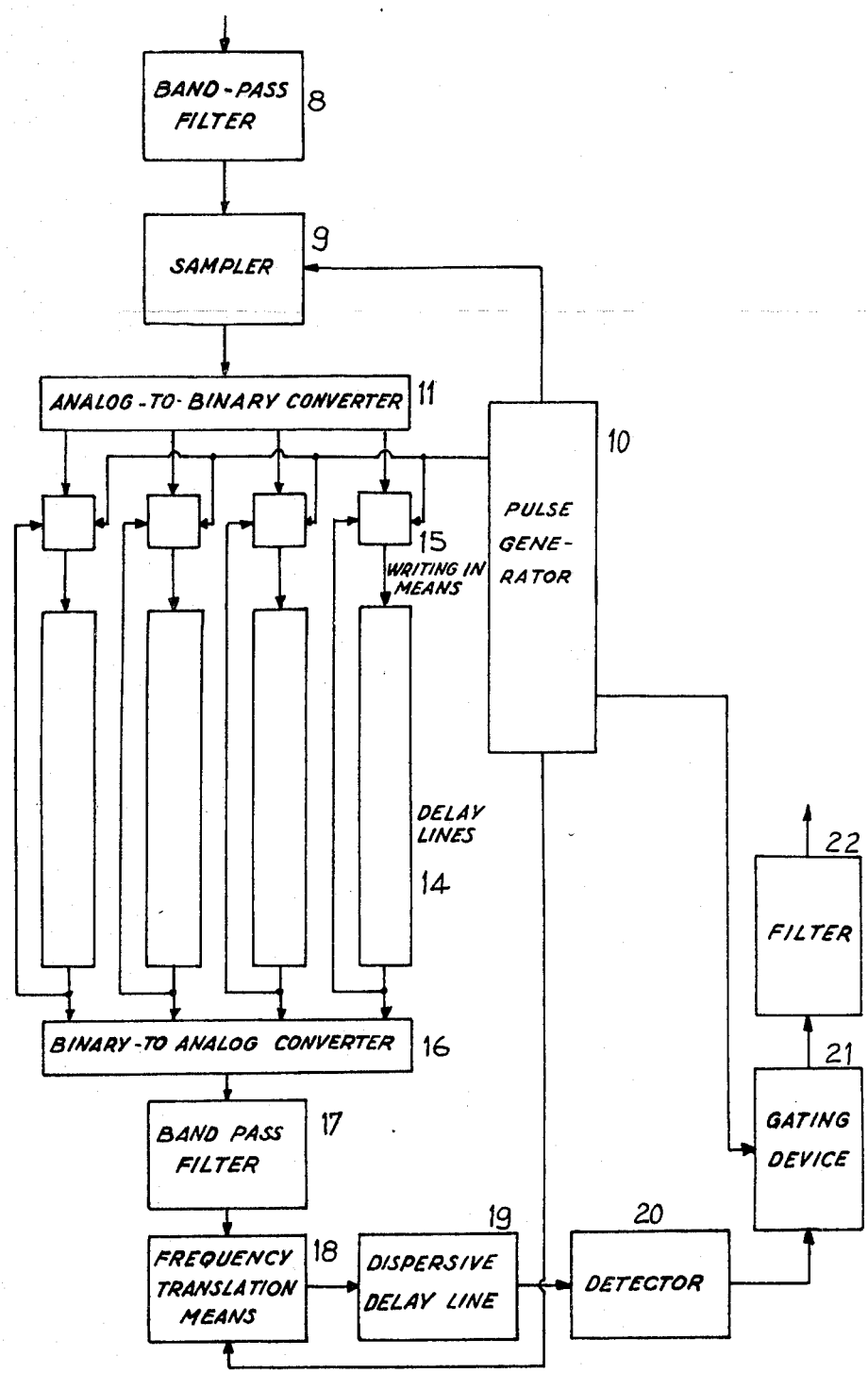
FIG. 3 is a detailed diagram of the matched filtering system in accordance with the invention.

The system in accordance with the invention carries out the matched filtering of a signal $S(t/K)$ in two separate operations which successively give rise to signals $S(t)$ and $S'(t)$. In order to distinguish properly these operations, examples of the signals $S(t)$ and $S'(t)$ have been illustrated in FIG. 2; it will be seen that $S(t)$ and $S'(t)$ are characteristics of the signals appearing at the input and output of a known kind of dispersive system. The signal $S(t/K)$ has not been shown in FIG. 2, since it does not differ from the signal $S(t)$ in any other respect than the choice of time scale; by changing the variable $t$ into the variable $t/K$, $K$ being an integer, it will be seen that the times are multiplied by $K$, while the frequencies are divided by $K$; thus, with the exception of a certain gain or attenuation factor, the signal $S(t)$ and its homologue $S(t/K)$ are homothetic in the ratio $K$. It is worth noticing that $S(t)$ is the time compressed signal, but, $S(t/K)$ may be also considered as a time expanded signal.

In the following, the transformation $S(t) \rightleftarrows S(t/K)$ will be referred to as "homothetic" in order to distinguish it from the transformation $S(t) \rightleftarrows S'(t)$, which will be termed "dispersive."

FIG. 1 shows a system which carries out the matched filtering of frequency modulated electrical signals. The system comprises dispersive means 1 which bring about the transformation of the signal $S(t)$ into the signal $S'(t)$, and sampling converter means which bring about the homothetic transformation of the signal $S(t/K)$ being processed into the signal $S(t)$; once these two transformations have taken place, the duration $KT$ of the signal being compressed, is reduced to $T/N$; $N$ is a characteristic of the input signal; $N$ is equal to the duration $KT$ of the signal $S(t/K)$ multiplied by its frequency modulation sweep $\Delta f$. By way of example the signal $S(t/K)$ can be the output signal delivered by an echo-ranging receiver.

The conversion of the signal $S(t/K)$ into the signal $S(t)$, is carried out by a ring recycling memory 2, constituted for example by a closed chain of $K$ cells the content of each of which is transferred to its neighbor with a regular periodicity; an information item written into the cell A circulates in the memory 2 in the direction of the arrow and reappears at the original cell at the end of $K$ transfers; this kind of recycling memory can be constituted by a delay line or by a shift register whose input is connected to its output. The device of FIG. 1 can be operated in two ways, which are respectively sketched by plain and broken lines. Considering first the plain connections which depict the time compression process applied to the signal $S(t/K)$, it will be seen that the signal $S(t/K)$ is picked up by a sampling device 3 which breaks it up into samples $E_i$; these samples $E_i$ are written successively into the cell A of the memory 2, using a write-in device 4, in such fashion that the sample $E_{i+1}$ which succeeds the sample $E_i$, is written into the cell A when the sample $E_i$ arrives in the cell U after having circled the memory arrow. A the direction of the arrow. A pulse generator 5 controls the devices 3 and 4 so that the periodicity $\theta$ of sampling of the signal $S(t/K)$ differs by the quantity $\tau/K$ from the time $\tau$ of circulation of the samples through the memory 2; $\theta = K+1/K \times \tau$.

The readout device 6 coupled to the memory 2, distributes the samples appearing in the 4 U at intervals of $\tau/K$; the output of the readout device produces sequences of $K$ samples which represent portions of the signal $S(t/K)$ corresponding to the $K$ last samples supplied by the sampling device 3. If a sequence of $K$ samples at the output of the readout device 6, is considered one will see that its content is repeated partially in the $K-1$ preceding and following sequences; since each sample is repeated $K$ times at intervals, the signals supplied by the readout device 6 are redundant and give rise, after processing in the device 1, to a plurality of short pulses whose amplitudes rise linearly during the time $K\tau$ and then decrease linearly during the same time. In fact, there should correspond to a given signal $S(t/K)$, just one series of short pulses whose envelope form is the self-correlation function of the signal $S(t/K)$.

In order to satisfy this condition, the invention provides for a coincidence device 7 controlled by the generator 5. The coincidence device 7 receives the multiple signals $S'(t)$ appearing at the output of the device 1 and picked up at time intervals of $\theta$ from the samples whose envelope reproduces the self-correlation function of the signal $S(t/K)$.

By reversing the order of operations, the system schematically shown in FIG. 1 is likewise capable of transforming a short pulse $S'(t)$ into a long pulse $S(t/K)$. In this case, the short pulse is applied to the device 1, which produces a first stretched pulse $S(t)$; the pulse $S(t)$ is then time expanded, to this end it is applied to the sampling device 3 which samples it at time intervals of $\tau/K$; the samples obtained are then written into the recycling memory 2 using the write-in device 4, and are subsequently received by the readout device 6 which carries out the readout function with a recurrence frequency of $\theta' = K-1/K \cdot \tau$; the device supplies to the coincidence circuit 7 a time expanded signal $S(t/K)$ of duration $KN$ times longer than the signal $S'(t)$.

Connections shown in broken line in FIG. 1 illustrate how the system may be operated in the reverse direction; the signal to be stretched is applied at I and the stretched signal is produced at O.

In FIG. 3, a more detailed diagram of a system for carrying out the matched filtering of frequency modulated electrical signals, can be seen. In order to follow the description of the operation of this system more easily, it will be assumed for example that the signal to be compressed is in the form of a sonar frequency modulated pulse having a rectangular envelope and a duration KT of 1 second, a center frequency $f_o$ of 400 c.p.s. and a frequency sweep $\Delta f$ of 200 c.p.s., i.e., $N=KT \Delta f=200a$.

The pulse to be compressed is received by a band-pass filter 8 which passes it to a sampling device 9; a pulse generator 10 supplies pulses having a recurrence frequency of 1,000 c.p.s., to the device 9, so that the latter operates sampling at this frequency. The samples are received by an analogue-to-digital converter 11 which produces groups of binary signals representing the algebraic value of the samples. The groups of binary signals appearing at the output of the converter 11 are fed into the delay lines 14 using write-in devices 15 whose inputs are connected respectively to the outputs of the converter 11 and the delay lines 14.

Thanks to the feedback-loop thus formed, the samples circulate in the delay lines 14 with a period $\tau$ which differs from the write-in period $\theta$ of the samples by the quantity $\tau/K$, $K$ being the number of samples which can be contained in each of the lines 14.

The number of lines placed in parallel is equal to the number of moments of the quantizing device.

At the output of the lines 14, the samples appear with a repetition frequency $K$ times higher than the sampling frequency of the signal to be compressed; the lines 14 supply a digital-to-analogue converter 16. The output of the converter 16 produces sequences of a duration $\theta$, containing variable duration sections of the homothetic signal $S(t)$ of the signal being processed, said homothetic signal being characterized by a duration $T$, a center frequency $Kf_o$ and a frequency modulation sweep $K\Delta f$. In the selected example, with $K=1,000$, one gets $T=1$ mS $Kf_o=400$ k.c.p.s. and $K\Delta f=200$ k.c.p.s.; the homothetic pulse is of the type $S(t)$ illustrated in FIG. 2. The matched filtering of the signals supplied by the converter 16 is accomplished by means of a dispersive delay line 19 coupled to the converter 16 through the medium of a band-pass filter 17 and a mixer 18, in order that the signals may be translated into the range of operation of the said line. At the output of the line 19, compressed pulses similar to the signal $S'(t)$ of FIG. 2, are obtained; the duration of these pulses varies as an inverse function of the modulation sweep; the minimum value of this duration is given by $I/N=5\mu sec$.

The pulses produced by the dispersive line 19 are detected by the amplitude detector 20 and applied to one of the inputs of a coincidence device 21. The coincidence device 21 is controlled by the generator 10 so that only signal fractions having a duration substantially equivalent to $T/N$ are transmitted; these fractions are transmitted at equal intervals of time, corresponding to the periodicity of write-in into the memories 14; they are transmitted to a filter 22 which integrates them to form a single pulse reproducing the self-correlation function of the signal $S(t/K)$; in the cited example, this function can be written as $\sin \pi Bt/\pi Bt$, where $B=200$ c.p.s.

Figure 4:
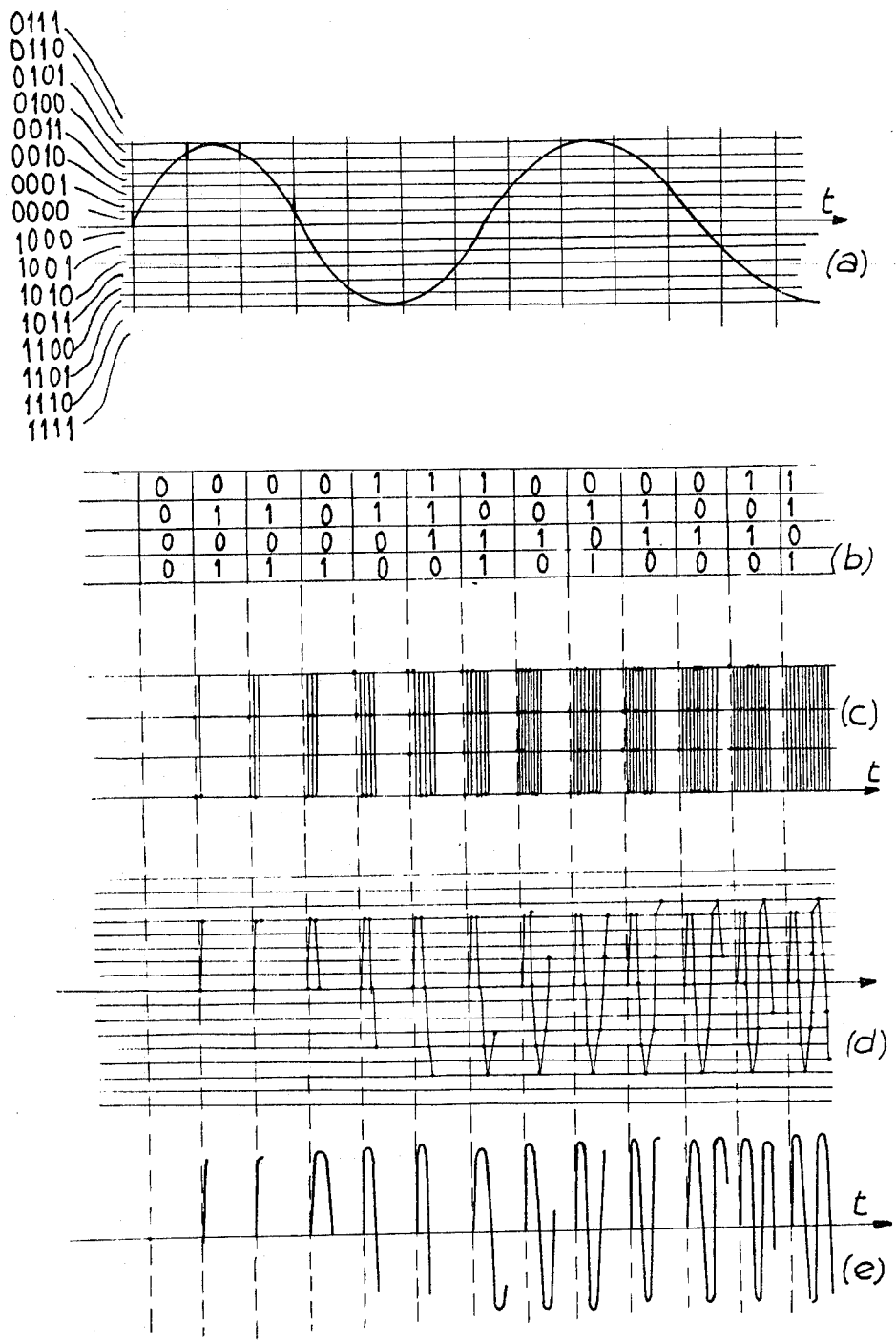
FIGS. 4 and 5 are explanatory diagrams.
Figure 5:
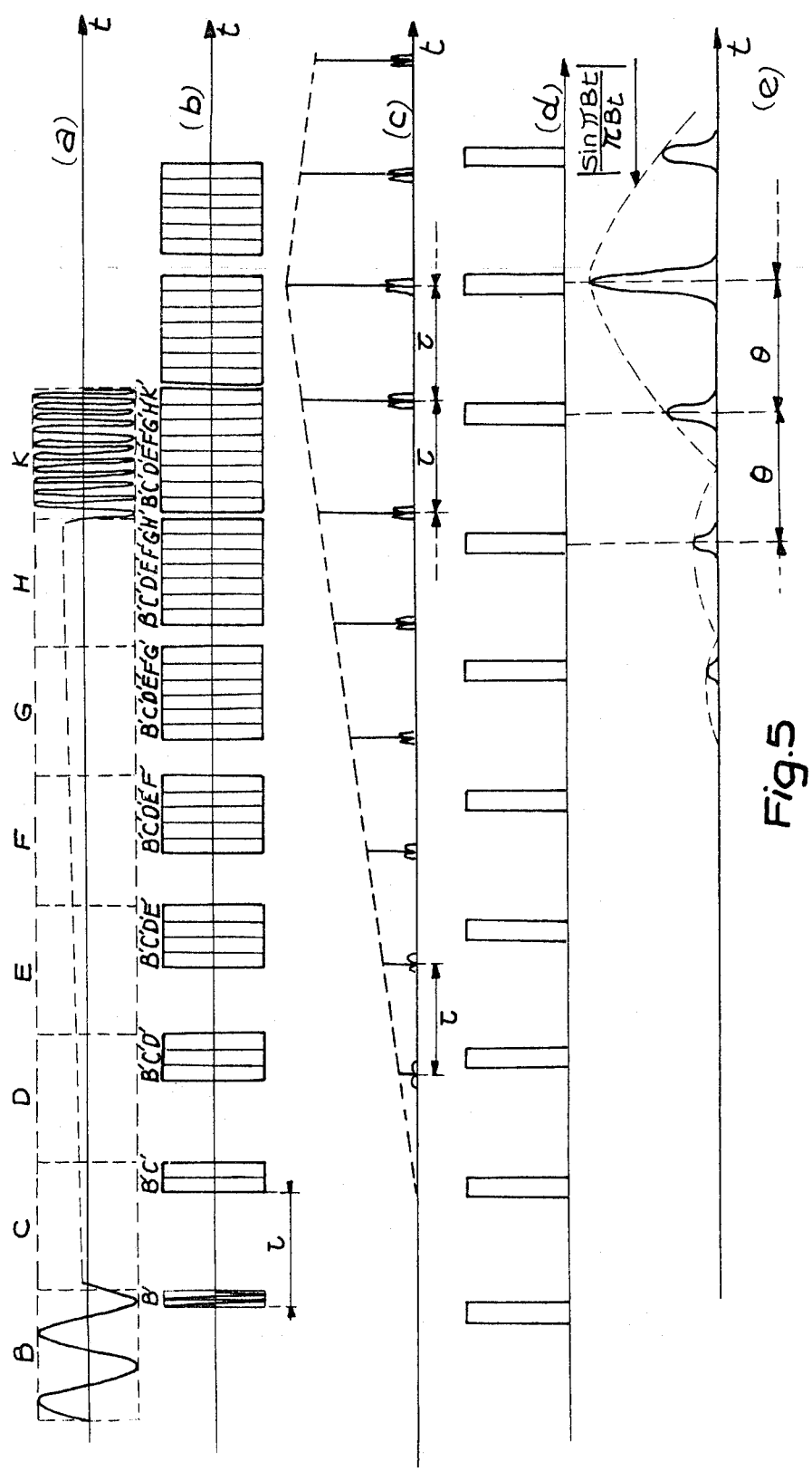

FIGS. 4 and 5 make it easier to follow the various transformations undergone by the pulse being processed, during its progress through the system of FIG. 3.

FIG. 4(a) illustrates a fragment of a sinusoidal waveform, representing a small section of the signal being processed; the parallel horizontal lines illustrate the quantizing levels of the analogue-to-digital converter 11 (for example, in this case, 16 levels for four quantizing moments), while the vertical lines pick out the times of sampling. In FIG. 4(b), the binary information items supplied by the analogue-to-digital converter 11 are shown, and each sampling corresponds with a group of four binary digits which are simultaneously written into the four delay lines 14 in place of four earlier information elements which have been erased.

FIG. 4(c) illustrates the samples successively written into the delay lines 14; these samples correspond to successive fractions of the signal of FIG. 4(a) and are repeated with a periodicity $\tau$ equal to the delay time of the lines 14.

When the binary information elements contained in the lines 14 are applied to the digital-to-analogue converter 16, a succession of signal fractions is supplied by said converter as illustrated in FIG. 4(d); by filtering these signal fractions by means of the filter 17, sinusoidal signal fragments are recovered, as shown in FIG. 4(e).

FIG. 5 provides an overall view of the process of compression. FIG. 5(a) illustrates a frequency modulated pulse split into eight fractions B, C, D, E, F, G, H, K.

These fractions, between the input of the filter 8 and the output of the mixer 18, are shortened in duration; the reduced fractions B', C', D', E', F', G', H' and K' are represented in FIG. 5(b).

FIG. 5(b) also shows that the shortened pulse fractions are repeated in order to form more and more complete fractions of the pulse being compressed; when the pulse being compressed has been fully sampled, the succeeding fractions become less and less complete. On applying the fractions B', B'C', B'C'D', . . ., illustrated in FIG. 5(b), to the dispersive line 19, there is obtained at the output of the detector 20 the sequence of compressed pulses illustrated in FIG. 5(c). The amplitude and width of the pulses thus obtained are functions of the frequency modulation sweep characteristic of each of the signal fractions illustrated in FIG. 5(b). It can be seen, by comparing FIG. 5(a) and 5(c), that the initial pulse has given rise to a plurality of highly compressed pulses; in fact, it is only the pulses of highest amplitude and narrowest width which are of any interest, since the other pulses relate to incompletely processed signals. All that remains, then, is to carry out on the train of pulses of FIG. 5(c) a process which will produce the sampled self-correlation function of $S(t/K)$; to this end, the output of the detector 20 is connected to a circuit 21 which produces the product of the train of FIG. 5(c) and a train of isochronous pulses illustrated in FIG. 5(d); the product of these two pulse trains is illustrated in FIG. 5(e).

The pulses of FIG. 5(d) have a periodicity equivalent to the duration of the fractions of the signal which is to be compressed; their width is equivalent to that of the narrowest pulse produced by the detector 20; since the periodicity of the pulses illustrated in FIG. 5(c) differs from the periodicity of the pulses shown in FIG. 5(d), the circuit 21 only produces a small number of narrow very high amplitude pulses.

FIGS. 3, 4 and 5 relate to a system by which compression of a frequency modulated pulse can be carried out. The pulse to be compressed may be produced by means of known types of generators, but it is of interest that it should be produced from a short pulse by operating the aforedescribed compressor in the reverse direction; this latter mode of operation offers the advantage that it provides excellent correlation between the signal which is to be compressed and the means which effect the compressing.

Figure 6:
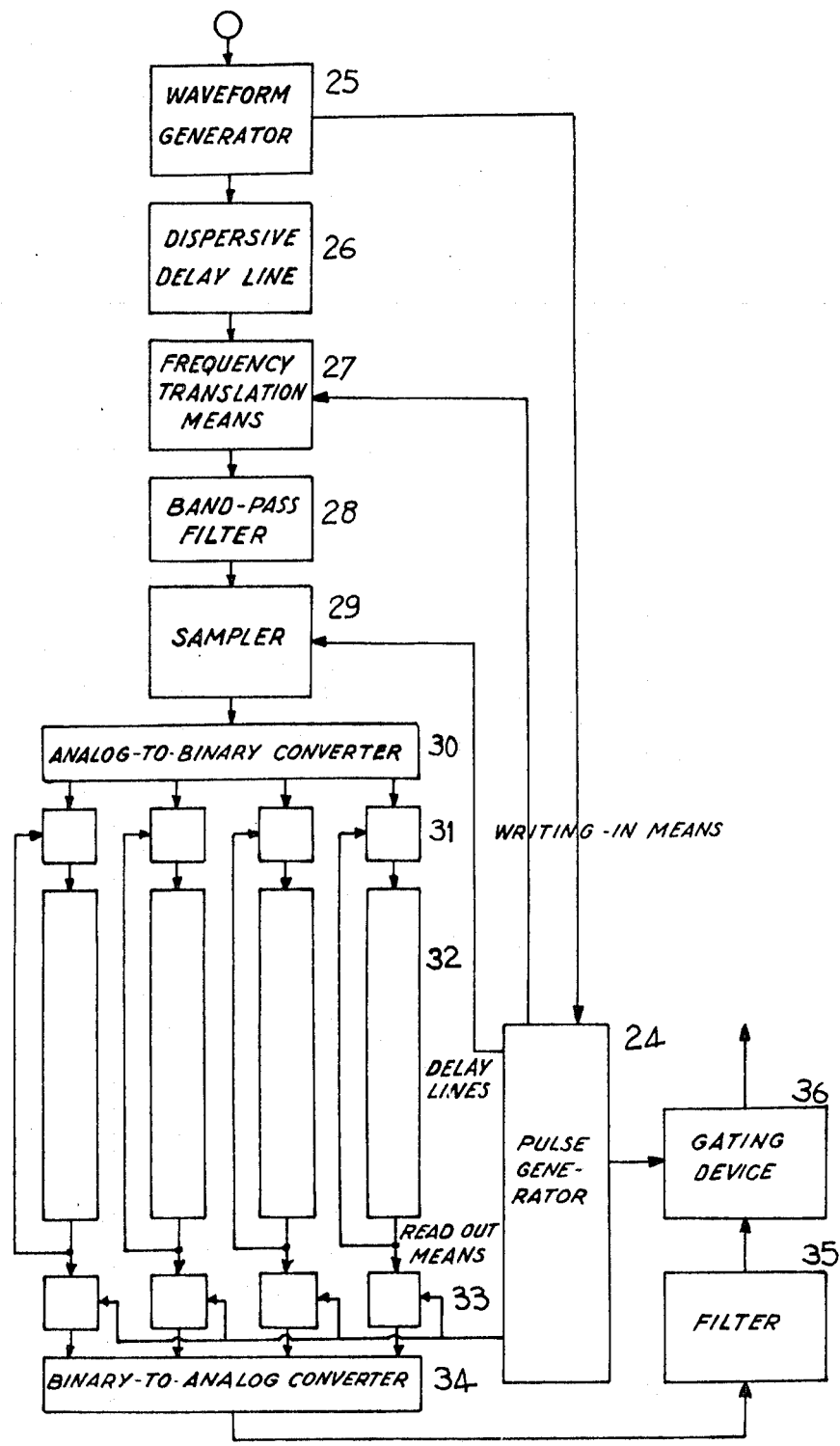
FIG. 6 is a detailed diagram of a system for generating the transmitted signal, in accordance with the invention.

In FIG. 6, the diagram of a system capable of stretching frequency modulated signals, has been shown. The signal to be stretched is a short $\sin t/t$ pulse identical to the pulse $S'(t)$ of FIG. 2. A generator 25 produces a signal the carrier frequency of which coincides with the center frequency of the dispersive line 26 and is amplitude-modulated in accordance with the envelope of the signal $S'(t)$. At the same time, the function generator 25 supplies a synchronizing pulse to the synchronizing circuit 24. The pulse $S'(t)$ having been applied to the input of the dispersive line 26, there appears at the output of said line a rectangular waveform signal of duration $T$ which is linearly frequency modulated with a sweep of $\Delta f$. This signal differs from the one which could be processed in the dispersive line by virtue of the direction of the frequency modulation, and it is therefore necessary to carry out on this signal inversion of the time base simultaneously with expansion in the ratio $K$, in order to obtain the signal $S(t/K)$.

At the output of the dispersive line 26, the signal is transposed in frequency by the mixer 27 which receives the local oscillator signal from the circuit 24. After passing through a band-pass filter 28, the stretched pulses, transposed in frequency, are received by a sampling circuit 29. The circuit 29 produces samples at a recurrence frequency fixed by the generator 24; these samples are applied to an analogue-to-digital converter 30 which transforms them into combinations of binary signals. Write-in means 31 receive the binary signals and record them in delay lines 32 at the periodicity of sampling.

The lines 32 are equipped with loop arrangements which enable the binary signals to circulate there; these signals reappear at the output of the said lines at the end of a time interval which is $K+1$ times the sampling periodicity. Readout circuits 33 pick off the samples with a periodicity $\theta$ equal to $K$ times the foregoing periodicity of sampling. The phase of the moments of readout, which is controlled by the circuit 24, makes it possible to take the samples in the opposite order to the order of write-in, and thus to reestablish the signal to its original time base relationship.

The binary signals supplied by the readout circuits 33 are processed by a digital-to-analogue converter which produces samples of the same amplitude as those furnished by the sampling circuit 29, but with a periodicity $K$ times as high. The signal produced by the converter 34 is filtered by the filter 35; a coincidence circuit 36 connected to the output of the filter 35 cuts out a fraction of duration $KT$ from the filtered signal; this signal fraction constitutes the $KN$ times stretched pulse which, in the case of sonar systems, is the one which is transmitted and received.

By way of a nonlimitative example it is possible to obtain a 1 second pulse modulated with a frequency sweep $\Delta f$ of 200 c.p.s. about a center frequency $f_o$ of 400 c.p.s. using the following characteristics:

The pulse $P$ furnished by the generator 25 has a duration $T/N$ of $5\mu$sec. and a center frequency of 2 m.c.p.s. The dispersive line 26 is matched to the characteristics hereinbefore mentioned; it produces a rectangular waveform frequency modulated pulse whose duration $T$ is 1 ms., this representing an expansion ratio of 200. The stretched pulse undergoes frequency changing in the mixer 27; the mixer 27, supplied with a local oscillator signal of 1.6 m.c.p.s., produces a pulse frequency modulated with a sweep defined between 300 k.c.p.s. and 500 k.c.p.s. The sampling of this pulse, which appears at the output of the filter 28, is carried out at 1 m.c.p.s.; the delay lines 32 produce a delay of $\tau=1,001\mu$sec. and each contain 1,001 binary signals. The picking up of these binary signals takes place with a periodicity which differs by 1 m.c.p.s. from the delay time $\tau$, in other words $\theta=1,000\mu$sec. The transfer of the binary signals to the converter 34 takes place regularly at a frequency of 1 k.c.p.s.; the signal fraction cut out by the coincidence circuit 36 has a duration of 1 second.

The foregoing numerical data and description, show that a frequency modulated pulse can be stretched in order to be subsequently compressed, using the same technique and using elements which for the most part are identical in both cases. There is excellent correlation between the signals produced by the system of FIG. 6 and the compressing properties of the system of FIG. 3; the combination of the two systems not only makes it possible to achieve a substantial economy in the number of elements which have to be used, but also makes it possible to achieve a high correlation ratio thanks to the reversibility of the signal processing functions. The alternate operation of the arrangement as an expansion system during transmission and as a compression system during reception, is controlled by the function generator 25.

Without departing from the scope of the present invention, the delay lines 14 and 32 constituting the closed loop memory, can be replaced by shift registers. The fact that operation of the system is based upon the use of binary signals, makes it possible to achieve high-compression ratios; the range of amplitude will be the wider the more quantized levels are provided in the converters; these levels will be equidistant or otherwise, all in accordance with the nature of the signals being compressed.

The homothetic transformation coefficient $K$ *coefficient can be adjusted by arranging at the point of each digital delay line, a buffer store of capacity "P." By writing the sample in groups of* $p$ each $q$ circulations, the coefficient $K$ is made $K'=(q/p)K$.

In addition, the ring-type memory may be constituted by a single delay line in which the groups of binary signals representing each of the samples follow one another in succession; in this latter case, the ring-type memory will be complemented by shift registers able to simultaneously receive the binary signals and transmit them sequentially or vice versa. Also, the dispersive line used in cascade with homothetic compressing devices, can have any desired characteristic which links the group delay to the frequency; it may be replaced by an appropriate electrical network or by a optical diffraction device which carries out the same operation on the signals which are to be compressed or stretched.

Of course, the invention is not limited to the embodiments described and shown which were given solely by way of example.

What is claimed is:

1. A signal-processing system for modifying in two successive steps the duration of frequency modulated pulses delivered by a signal source, said system comprising: means having an input and an output channel for converting a signal corresponding to each of said pulses into at least one modified duration signal having the same waveform and a duration modified in the ratio $K$, gating means having a signal input coupled to said output channel and a control input; control means coupled to said converting means and to said control input for selecting one of said modified duration signals for each pulse to be processed and dispersive delaying means inserted within one of said channels for impressing another duration modification on each said pulses.

2. A signal-processing system as claimed in claim 1, wherein said converting means comprise sampling means having an input for receiving said pulses and an output supplying a series of samples for each of said pulses, and storage means receiving the samples of each series and supplying a sequence of discrete signals, each of which is continuous and formed of a number of successive samples of the series, and one of which, referred to as the complete signal, includes all the samples of the series; said dispersive delay means having an input for receiving said discrete signals and an output for delivering corresponding compressed signals; said gating means selecting the compressed signal corresponding to said complete signal.

3. A system as claimed in claim 1, wherein said dispersive delay means are located in said input channel; said converting means comprising sampling means having an input for receiving pulses of extended duration from said dispersive delay means and an output delivering a series of samples for each of said extended duration pulses; said converting means further comprising storage means receiving the samples of each series and delivering an output signal formed of samples of increased spacing; said gating means being controlled for selecting said output signal.

4. A system as claimed in claim 1, wherein said converting means comprise sampling means having an input coupled to said input channel, a control input coupled to said control means and an output, and storage means having an input coupled to the output of said sampling means, a control input coupled to said control means and an output coupled to said output channel.

5. A system as claimed in claim 4, wherein said sampling means comprise quantizing means associated to analog to binary conversion means; the output of said storage means being coupled to said output channel through digital to analog conversion means.

6. A system as claimed in claim 4, wherein said storage means comprise writing-in means having an input coupled to said sampling means output, a control input coupled to said control means and an output, a ring memory having an input coupled to the output of said writing-in means, and an output, and readout means having an input coupled to the output of said ring memory, a control input coupled to said control means and an output coupled to said output channel.

7. A system as claimed in claim 6, wherein said ring memory comprise at least one delay line having an input and an output coupled to each other through a feedback loop.

8. A system as claimed in claim 6, wherein the writing-in and the readout periods of said storage means differ from each other by amount equal to the revolution period within said ring memory.

9. A system as claimed in claim 2, further comprising first band-pass filtering means coupled to the input of said sampling means and second band-pass filtering means positioned between the output of said converting means and the input of said dispersive delay means.

10. A system as claimed in claim 2, further comprising frequency translation means positioned between the output of said converting means and the input of said dispersive delay means.

11. A system as claimed in claim 2, further comprising low-pass filtering means coupled to the output of said gating means.

12. A system as claimed in claim 3, further comprising generator means for supplying said first mentioned pulses to the input of said dispersive delay means.

13. A system as claimed in claim 3, further comprising frequency translation means positioned between the output of said delay means and the input of said sampling means.

14. A system as claimed in claim 13, further comprising band-pass filter means connecting the output of said frequency translation means to the input of said sampling means.

15. A system as claimed in claim 3, further comprising filtering means positioned between said converting means and said gating means.

* * * * *